Figure 1:
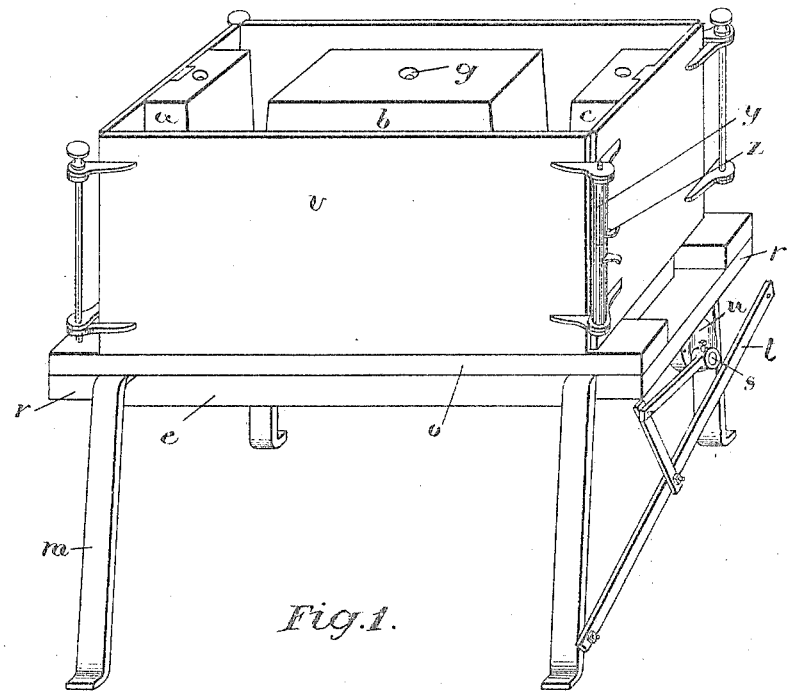

No. 802,848. PATENTED OCT. 24, 1905.
W. E. DUNN.
MOLDING MACHINE FOR MAKING BUILDING BLOCKS.
APPLICATION FILED NOV. 12, 1904.

2 SHEETS—SHEET 1.

Witnesses.
L. J. Bock
H. L. Trimble

Inventor.
William E. Dunn
by Chas. W. Riches
his attorney

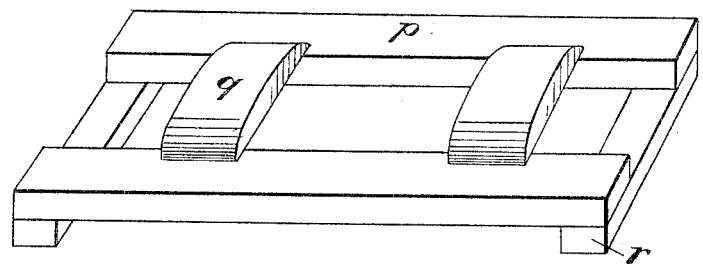
Fig. 3.
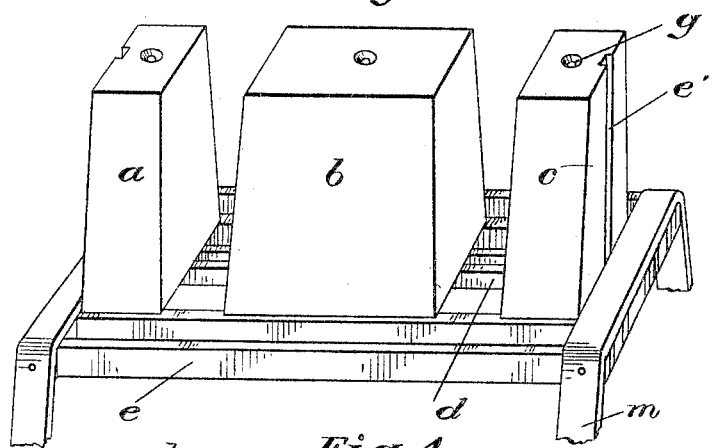
Fig. 4.
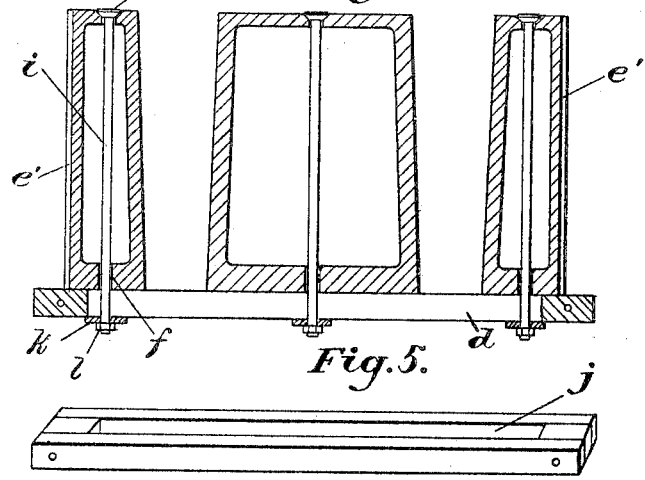
Fig. 5.
Fig. 6.

UNITED STATES PATENT OFFICE.

WILLIAM E. DUNN, OF CHICAGO, ILLINOIS, ASSIGNOR OF ONE-HALF TO FREDERICK W. DUNN, OF WOODSTOCK, CANADA.

MOLDING-MACHINE FOR MAKING BUILDING-BLOCKS.

No. 802,848.        Specification of Letters Patent.        Patented Oct. 24, 1905.

Application filed November 12, 1904. Serial No. 232,471.

*To all whom it may concern:*

Be it known that I, WILLIAM EDWIN DUNN, of Chicago, in the county of Cook and State of Illinois, have invented certain new and useful Improvements in Molding-Machines for Making Building-Blocks; and I hereby declare that the following is a full, clear, and exact description of the same.

The first part of the invention relates to the core, which may consist of any number of core parts adjustably mounted upon a slotted bar or two parallel bars with a space between them secured to a hollow base supported by suitable standards or legs, so that any part of the building-block material which may filter through the space between the pallet and cores will clear itself of the apparatus, and passing through the slotted bar or bars and core parts are bolts having beveled heads contained in countersunk seats at the ends of the bolt-apertures, the outer ends of the bolts having washers and nuts to engage the under side of the slotted bar or bars and clamp the core and parts in position upon its upper surface.

The second part of the invention relates to the pallet, which consists of two side pieces positioned to contact the sides of the core parts and held together by arched braces, fastened to their upper surface to form in the under side of the building-block correspondingly-shaped recesses to facilitate the handling and laying of the blocks and to effect a saving in the quantity of the material required in their manufacture, and to the under surface of the side pieces are rigidly fastened cross-stays to stiffen the side pieces and assist the arched cross-pieces in holding them together, the under stays protruding a short distance beyond the ends of the base and positioned to be engaged by a lifting device, which consists of a longitudinally-disposed shaft journaled below the middle of the cores, having eccentrics or lifting-cams, so that during the revolution or partial revolution of the shaft when actuated the lifting-cams or eccentrics will engage the cross-stays and raise the pallet, with the molded block and flask, a predetermined and limited distance to free the core parts from the pressure and adhesion of the concrete, so that the homogeneity of the molded mixture will not be disturbed during removal of the molded block from the core.

The third part of the invention relates to the flask, which consists of any suitable number of side walls articulatingly connected together by hinge members and having centering members to engage corresponding centering members formed in or attached to the core parts to accurately position the flask upon the pallet or follow-board, so that one size of pallet may be used with various sizes of flasks to produce a corresponding variety of sizes of molded blocks, the side walls being fitted with a suitable locking means to fasten them in their closed position.

For a full understanding of the invention reference is to be had to the following description and to the accompanying drawings, in which—

Figure 2:
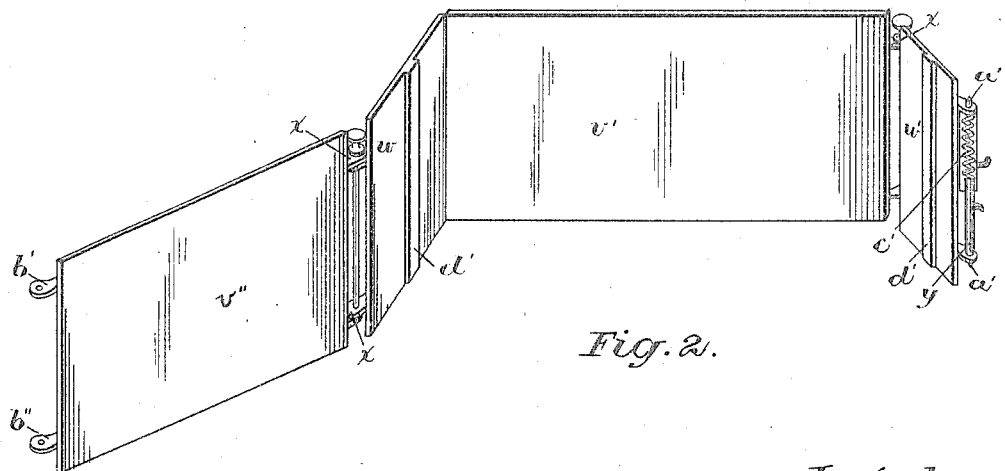

Figure 1 is a perspective view of the complete machine, showing the parts in their assembled position. Fig. 2 is a detail view of the flask, showing the position of the side walls when opened to allow of the flask being removed from the molded block. Fig. 3 is a perspective view of the pallet. Fig. 4 is a perspective view of the supporting-base and core parts. Fig. 5 is a longitudinal section through the core parts, and Fig. 6 is a view of the slotted bar or bars upon which the core parts are adjustably mounted.

Like letters of reference refer to like parts throughout the specification and drawings.

The core parts $a$, $b$, and $c$ are adjustably mounted upon the slotted bar $d$, supported by the hollow base $e$, and formed through the middle of the core parts $a$, $b$, and $c$ are bolt-apertures $f$, having at their upper ends countersunk seats $g$ to receive the beveled heads $h$ of the adjusting-bolts $i$, contained in the bolt-apertures $f$ and projecting through the slot $j$ in the slotted bar $d$. Fitted on the outer ends of the adjusting-bolts $i$ are washers $k$ to engage the under surface of the slotted bar $d$ and clamping the washers $k$ against the slotted bar $d$ are lock-nuts $l$. By means of the adjusting-bolts $i$ and lock-nuts $l$ the core parts $a$, $b$, and $c$ can be adjusted relatively to each other and upon any part of the slotted bar between its opposite ends. By this adjustment it is possible to accurately position the core parts to the length of the flask, so that one set of core parts may be used for several sizes of flasks.

The hollow base $e$ has supporting-legs $m$ to raise it a suitable distance above the surface upon which it is standing, so that any of the material used in the manufacture of the block filtering through the space between the pallet and core parts will readily clear itself of the machine.

Surrounding the lower end of the core parts is pallet o, which consists of two side pieces p, having on their upper surface arched braces q, positioned to enter the spaces between the core parts, and rigidly fastened to the under surface of the side pieces p are cross-stays r, which project slightly beyond the ends of the base e. The arched braces form in the face of the molded block correspondingly-shaped recesses which effect a saving of the material from which the block is made, provide gripping means to facilitate the handling of the block, and means for the retention of the mixture to cement the blocks together when laid. Journaled in the base e, below the middle of the core parts a, b, and c, is a shaft s, actuated by a treadle or lever t, and mounted upon the shaft s are eccentrics or lifting-cams u to engage the under surface of the cross-stays r and raise the pallet, with its load, a predetermined or limited distance, so that the core parts will be relieved of the pressure and adhesion of the molded block to allow of the pallet, with its load, being manually raised above the top of the core and then carried to a place where the block is to season or harden.

Inclosing the core parts is flask v, consisting of two side members v' and v'' and two end members w and w'. The end member w is hinged to the adjacent ends of the side members v' and v'' by suitable hinges x, and the end of member w' is hinged to the adjacent end of the side member v' by a similar hinge and temporarily locked to the adjacent end of the side member v'' by a suitable locking device. As shown in the drawings, this locking device consists of two spring-tensioned telescoping parts y, having hand-grips z, by means of which they are contracted to withdraw their pointed ends a' from the apertured lugs b' and b'', connected, respectively, to the adjoining ends of the end member v'', so that the side walls of the flask may be opened into the position shown in Fig. 2 during its removal from the molded block or to contract the telescoping parts into the same position, so that the pointed ends may be positioned opposite the apertured lugs a' and b' to allow of the tension-spring c' forcing the pointed ends into the apertured lugs when the pressure upon the hand-grips has been released. To properly position the mold upon the pallet, the inner surfaces of the end members w and w' are provided with the centering or positioning members d' to engage corresponding positioning or centering members e' on the adjacent surfaces of the core parts a and c, so that when the flask is placed around the core parts it will be held properly positioned without any assistance from the pallet.

In the use of the apparatus the core parts a, b, and c are adjusted upon the slotted bar d. The pallet is then placed in position around the core parts, and the flask is then placed upon the pallet, being centered or positioned by the engagement of the centering members d' and e'. The material is then placed within the flask and tamped into a homogeneous mass in the usual way. When the molding of the block is completed, the treadle or lever t is actuated to rotate the shaft s, so that the eccentrics or lifting-cams u will come into contact with the under cross-stays r and raise the pallet o a predetermined distance, so that the core parts, which ordinarily are of a tapering shape, will be released from the pressure and adhesion of the molded material. When this has been effected, the pallet with the molded block and flask are lifted from the core and carried to the place where the molded block is to season or harden, and the locking device for the flask sides is then actuated to permit of the sides being opened, so that they may be disengaged from the molded block without disturbing its structure.

Having thus fully described my invention, what I claim as new, and desire to secure by Letters Patent, is—

1. In a molding-machine for making building-blocks the combination of a base longitudinally apertured, a slotted bar forming part of the apertured base with longitudinally-disposed apertures a at each side thereof, core members adjustable on the slotted bar, a locking means to hold the core members in their adjusted position on the slotted bar, a pallet consisting of two parallel side bars to embrace the sides of the core members and arched braces connected to the side bars so as to enter the spaces between the core members.

2. In a molding-machine for making building-blocks the combination of a base longitudinally apertured, a slotted bar forming part of the apertured base with longitudinally-disposed apertures at each side thereof, core members adjustable on the slotted bar, a locking means to hold the core members in their adjusted position on the slotted bar, a pallet consisting of two parallel side bars to embrace the sides of the core members and arched braces connected to the side bars so as to enter the spaces between the core members, a shaft journaled in bearings in the base, pallet-lifters mounted upon the shaft, and means for actuating the shaft so that the pallet-lifters may raise the pallet from the base.

3. In a molding-machine for making building-blocks the combination of a base longitudinally apertured, a slotted bar forming part of the apertured base with longitudinally-disposed apertures at each side thereof, core members adjustable on the slotted bar, a locking means to hold the core members in their adjusted position on the slotted bar, a pallet consisting of two parallel side bars to embrace the sides of the core members, and arched braces connected to the side bars so as to enter the spaces between the core members, and a flask consisting of articulating sides and a means for locking the sides together when inclosing the pallet and core members.

4. In a molding-machine for making building-blocks the combination of a base longitudinally apertured, a slotted bar forming part of the apertured base with longitudinally-disposed apertures at each side thereof, core members adjustable on the slotted bar, a locking means to hold the core members in their adjusted position on the slotted bar, a pallet consisting of two parallel side bars to embrace the sides of the core members and arched braces connected to the side bars so as to enter the spaces between the core members, a shaft journaled in bearings in the base, pallet-lifters mounted upon the shaft to raise the pallet from the base, and a flask consisting of articulating sides and means for locking the sides together when inclosing the pallet and core members.

5. In a molding-machine for making building-blocks the combination of a base longitudinally apertured, a slotted bar forming part of the apertured base with longitudinally-disposed apertures at each side thereof, core members adjustable on the slotted bar, a locking means to hold the core members in their adjusted position on the slotted bar, a pallet consisting of two parallel side bars to embrace the sides of the core members and arched braces connected to the side bars so as to enter the spaces between the core members, a flask consisting of articulating sides and a locking means for holding the free ends of the adjoining sides together consisting of two spring-tensioned bolt-sections means for contracting the sections, and apertured lugs for the free ends of the adjoining sides to receive the ends of the locking bolt-sections.

6. In a molding-machine for making building-blocks the combination of a base longitudinally apertured, a slotted bar forming part of the apertured base with longitudinally-disposed apertures at each side thereof, core members adjustable on the slotted bar, a locking means to hold the core members in their adjusted position on the slotted bar, a pallet consisting of two parallel side bars to embrace the sides of the core members and arched braces connected to the side bars so as to enter the spaces between the core members a shaft journaled in bearings in the base, pallet-lifters mounted upon the shaft, and means for actuating the shaft to cause the pallet-lifters to raise the pallet from the base, a flask consisting of articulating sides, and a locking means for holding the free ends of the adjoining sides together consisting of two spring-tensioned bolt-sections, means for contracting the sections, and apertured lugs for the free ends of the adjoining sides to receive the ends of the locking bolt-sections.

Chicago, October 8, 1904.

W. E. DUNN.

In presence of—
J. G. WALLACE,
ELLA L. CLARKE.